United States Patent

[11] 3,556,145

| [72] | Inventor | Harry Sugden, Jr.<br>Statesboro, Ga. |
|---|---|---|
| [21] | Appl. No. | 871,041 |
| [22] | Filed | July 16, 1969<br>Division of Ser. No. 728,295, May 10, 1968. |
| [45] | Patented | Jan. 19, 1971 |
| [73] | Assignee | Rockweld Manufacturing Company<br>Pittsburgh, Pa.<br>a corporation of Pennsylvania |

[54] FLUID MOTOR SUPPLY AND CONTROL VALVE
5 Claims, 6 Drawing Figs.

[52] U.S. Cl. .................................................... 137/596.15,
  137/596.2
[51] Int. Cl. .................................................... F16k 11/10
[50] Field of Search .......................................... 137/596,
  596.12, 596.13, 596.14, 596.15, 596.2; 91/420,
  454, 461, 462, 464

[56] References Cited
UNITED STATES PATENTS

| Re. 26,523 | 2/1969 | Tennis | 137/596.15X |
| 3,411,536 | 11/1968 | Tennis | 137/596.15 |

*Primary Examiner*—Henry T. Klinksiek
*Attorney*—Strauch, Nolan, Neale, Nies and Kurz ABSTRACT: A fluid motor four-way fluid pressure responsive control valve for determining the direction and rate of flow of the motive fluid in response to the positioning of a manually operable double poppet pilot valve selectively operable to controllably vent the downstream side of selected inlet chamber and outlet chamber fluid pressure responsive valves to predetermine the direction and rate of flow of the motive fluid to the fluid motor.

INVENTOR
HARRY SUGDEN, JR.

ATTORNEYS

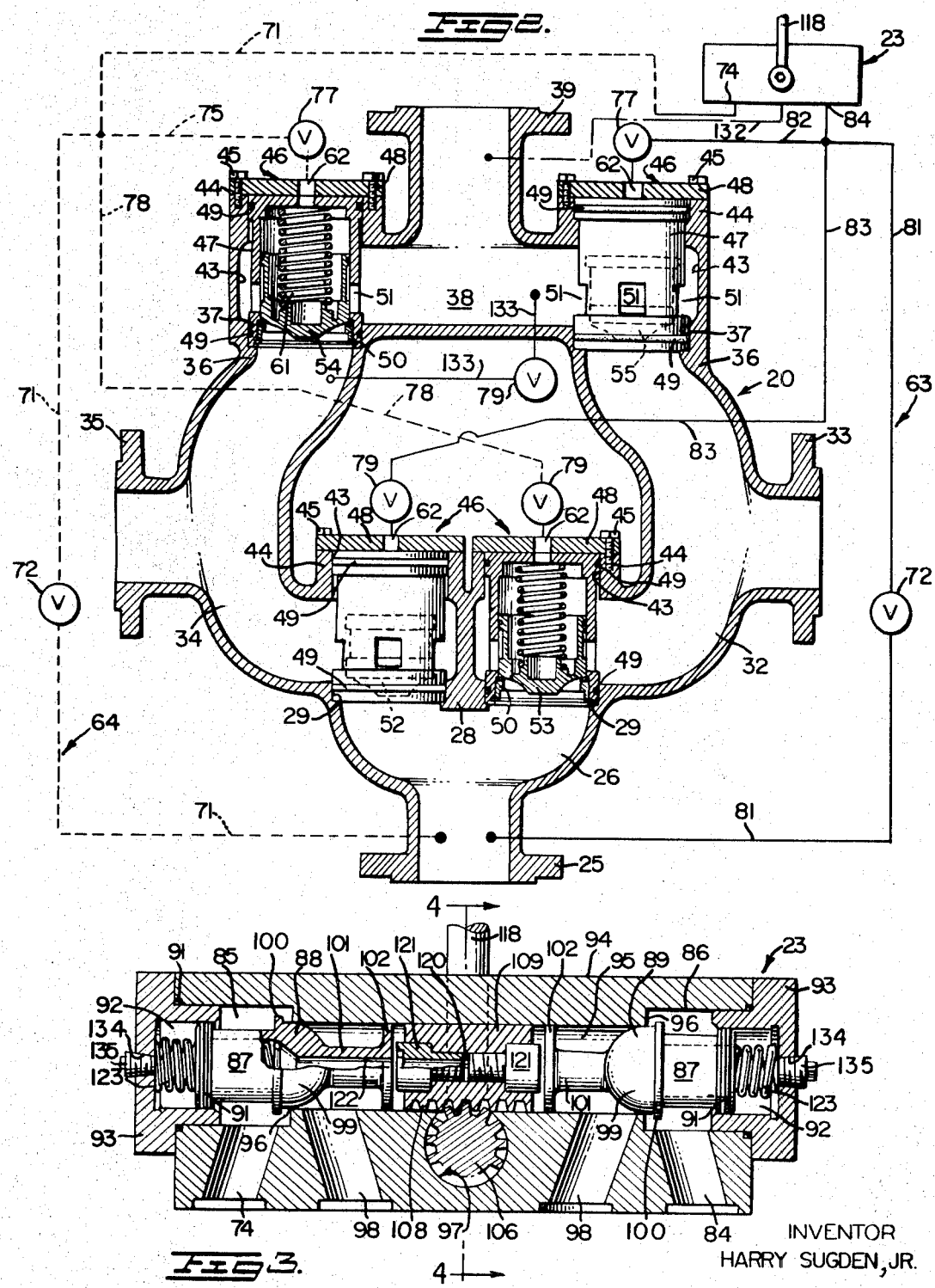

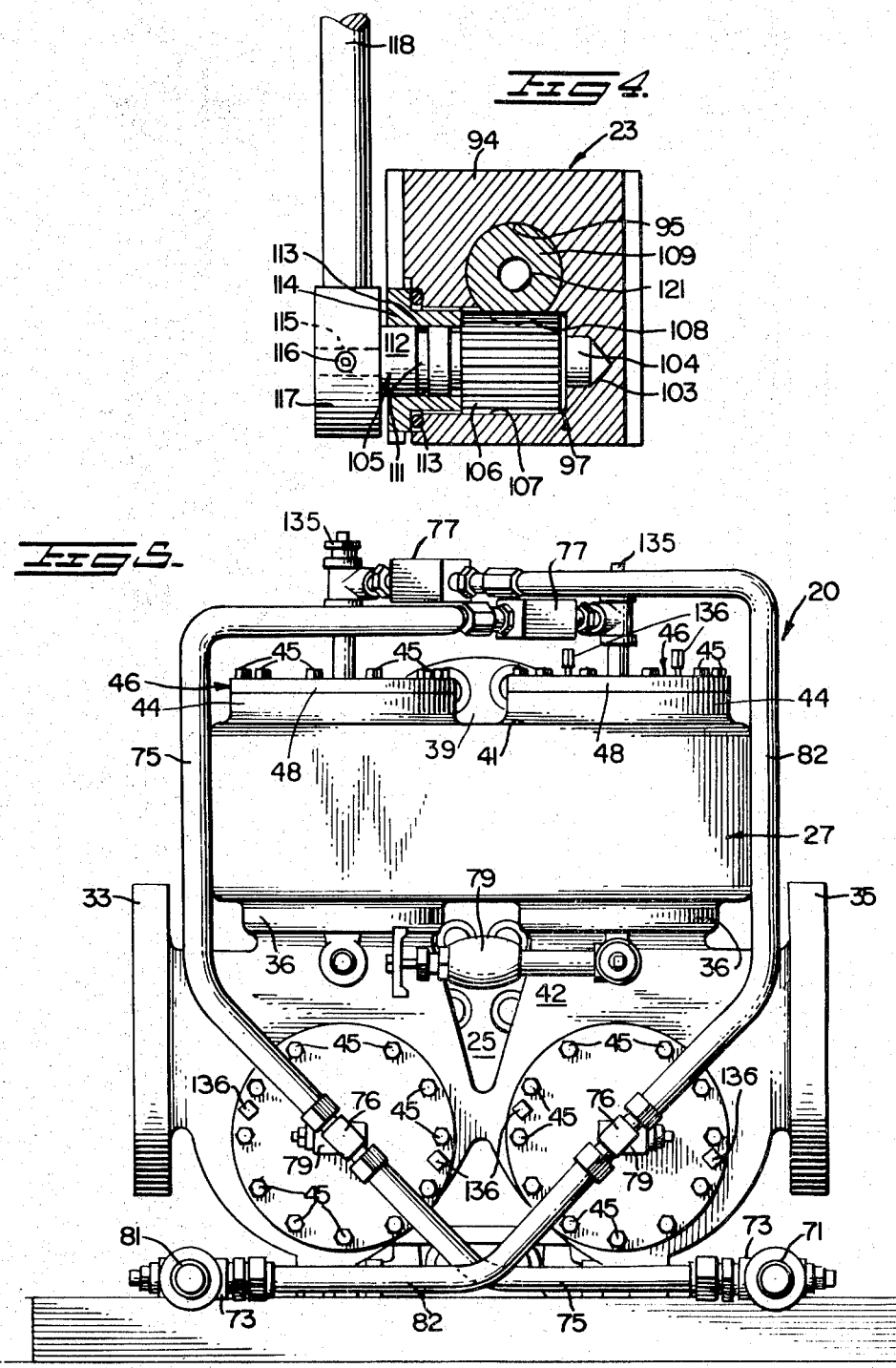

3,556,145

FLUID MOTOR SUPPLY AND CONTROL VALVE

This is a division of copending application Ser. No. 728,295 filed May 10, 1968 for Fluid Motor Control System and Supply and Control Valve Therefor.

BACKGROUND OF INVENTION

The present invention is directed to the improvement and compacting of the control valving employed to operate fluid motors of the type disclosed in U.S. Pat. No. 2,913,990 of C. R. Taylor issued Nov. 24, 1959. In the operation of such motors, it has been customary to employ several valves for directing and controlling the rate of flow of the motive fluid. Such multiplication of valve structures not only increase space requirements but complicates the problem of adjusting the several distinct valves so they will function in proper coordinated fashion.

SUMMARY OF INVENTION

It is a primary object of this invention to provide a fluid motor control valve that will be compact and provide ready and accurate adjustment to assure proper coordinated functioning of the several flow control elements.

This end is effected for the most part by the provision of a four-way motive fluid supply or main valve having respective motive fluid inlet and outlet chambers and a pair of motor chambers connected to the opposite ports of the fluid motor and respectively connected at their opposite ends to the fluid inlet and outlet chamber through respective fluid pressure responsive valves opening in the direction of flow therethrough and operable in opposing paired relation by a simple double poppet pilot valve so as to supply motive fluid at a selected rate to the motor from the selected motor chamber to establish the direction and speed of operation of the fluid motor. The pressure responsive valves are in essence mere piston-type shut off valves movable to and from closed position by fluid pressures directed onto the piston from within the body of the main valve, for example, of the general type shown in U.S. Pat. 2,841,359 of William F. Berck issued July 1, 1958. In using such pressure responsive valves in the manner suggested above, the respective pressure responsive valves controlling fluid flow to the motor chambers of the supply valve will be subjected to full motor inlet fluid pressure in an opening direction while the pressure responsive valves controlling fluid flow from the motor chambers of the supply valve will be subjected to the always lesser motor outlet fluid pressure in an opening direction. As a consequence, the inlet chamber valve at all times will be "more open" than the outlet chamber valve ensuring that only one valve of the paired operating valves will regulate flow and that valve oscillations or "hunting" is prevented.

It is another important object of the present invention to provide a four-way valve having (1) a first body section of generally figure eight configuration formed to provide side by side, end abutting noncommunicating motor chambers having a common overlying inlet chamber with a centered flanged inlet port along one face communicating with the respective motor chambers through ported valve seats facing toward the other face of said first body section which is apertured in coaxial relation to said valve seats and mounts therein respective removable, normally closed, pressure responsive valve assemblies for controlling fluid flow from the inlet chamber to the respective motor chambers which have respective flanged motor connection ports at the opposite ends of the first body section and (2) a second body section formed to provide an outlet chamber superposed upon and communicating with said respective motor chambers through ported valve seats facing toward the opposing face of said second body section which is apertured in coaxial relation to the last-mentioned valve seats and mounts therein respective removable, normally closed pressure responsive valve assemblies for respectively controlling fluid flow from the motor chambers to the outlet chamber which is provided with a flanged outlet port.

Still another object of the present invention resides in providing the main valve of the first object with a normally open needle valve controlled bypass connection between the outlet chamber and one of the motor chambers to prevent the formation of a vacuum in the motor loop and assure a source of oil to maintain the motor loop filled when the motor loop is closed off by closing off the main supply valve and the oil cools down and contracts.

A still further object of the present invention resides in providing respective sets of external pipe for connecting the main supply valve of the second object to the pilot control valve of the third object to form the system of the first object, each of said respective sets of external pipe comprising a T-fitting having an inlet connected through a valve controlled line to the main supply valve inlet chamber and its other connections respectively connected by a straight open line to one of the pilot valve inlets, and by respective valve controlled branch lines to the downstream side of the pressure responsive valve assembly leading to one of the motor chambers, and to the downstream side of the pressure responsive valve assembly leading from the other motor chamber whereby the required adjustments of pressure can be effected to assure that the pressure applied to the downstream side of the operating pressure responsive valves at full opening of the pilot control valve approximates the exhaust pressure in the supply valve exhaust chamber and that the flow of fluid to and from the pressure responsive valves can be varied to obtain the desired rate of valve response.

BRIEF DESCRIPTION OF THE DRAWINGS

Further objects of the present invention will appear from the following description and appended claims when read in conjunction with the accompanying drawings wherein:

FIG. 2 is a schematic view illustrating the varying flow paths and their respective adjustments provided by the motor control system of this invention;

FIG. 3 is a longitudinal vertical sectional view through the manually operable pilot valve of FIG. 1 taken substantially along line 3-3 of FIG. 1;

FIG. 4 is a transverse sectional view through the manually operable pilot valve of FIG. 3 taken substantially along line 4-4 of FIG. 3;

FIG. 5 is an elevational view of the four-way motor control valve of FIG. 1 as viewed from the side of FIG. 1 opposite that containing the inlet and outlet port connections.

DESCRIPTION OF PREFERRED EMBODIMENT

Figure 1:
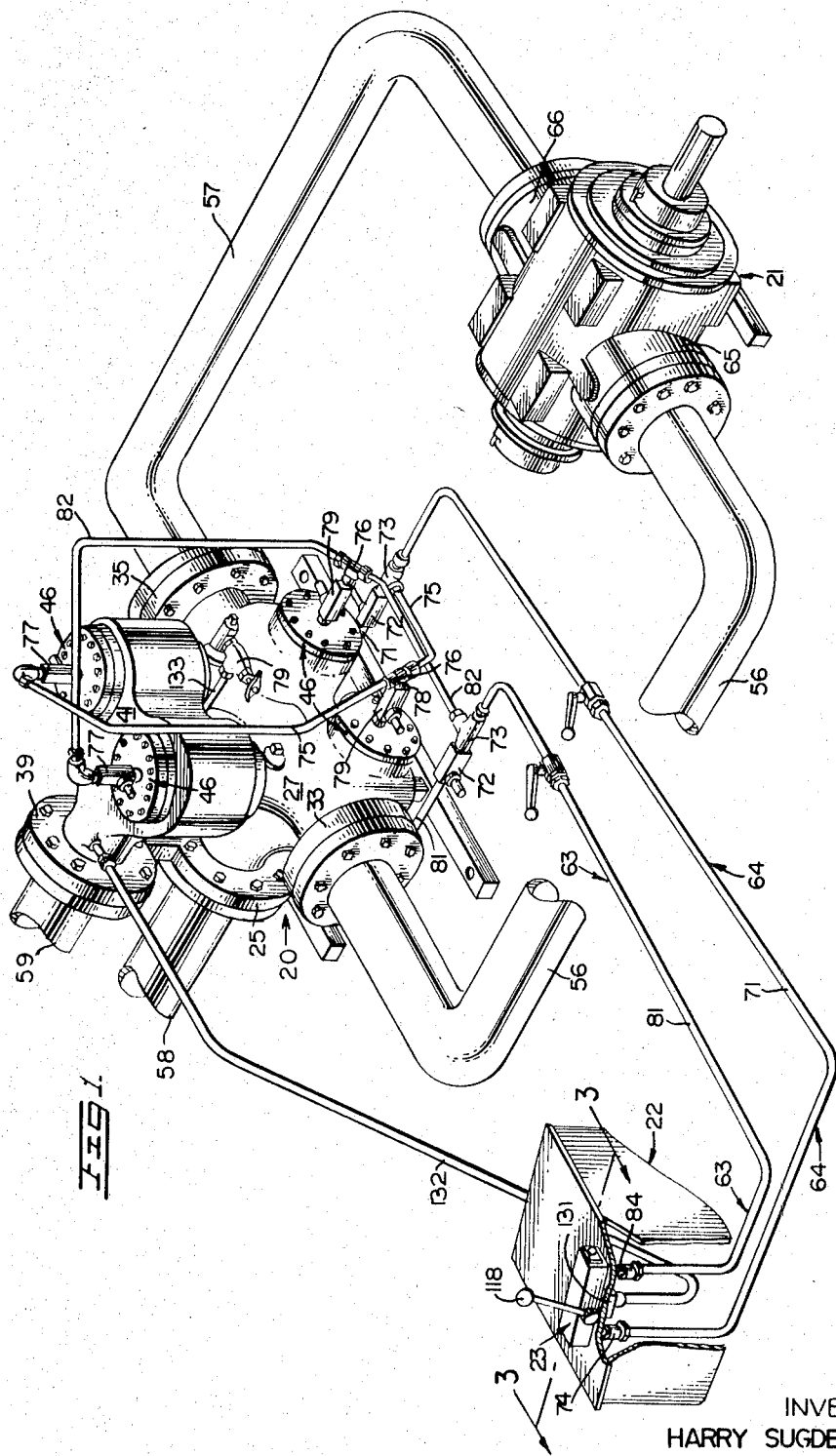
FIG. 1 is a perspective view illustrating the simplified motor control system provided when employing the four-way motor control valve of the present invention.

With continued reference to the drawings where the same reference numerals are employed throughout the several figures of the drawings to indicate the same parts, the present disclosure illustrates the supply and control valve of this invention in a fluid motor control assembly of unusual simplicity and compactness predicated on the employment of primary fluid control valve 20 of novel construction for channelling and controlling the rate of flow of the driving fluid to and from the fluid motor 21 under manual control of an operator at a deck stand 22 provided with a manually operable direction and speed control pilot valve 23. While fluid motor 21 may be of any conventional construction, for example, one of the "Roto Cycle" motors marketed by the assignee of this application, Rockwell Manufacturing Company, and illustrated generally by the disclosure of the aforementioned U.S. Pat. No. 2,913,990 of C. R. Taylor, primary valve 20 and speed control pilot valve 23, both of novel construction, will be hereinafter described in detail.

Figure 6:
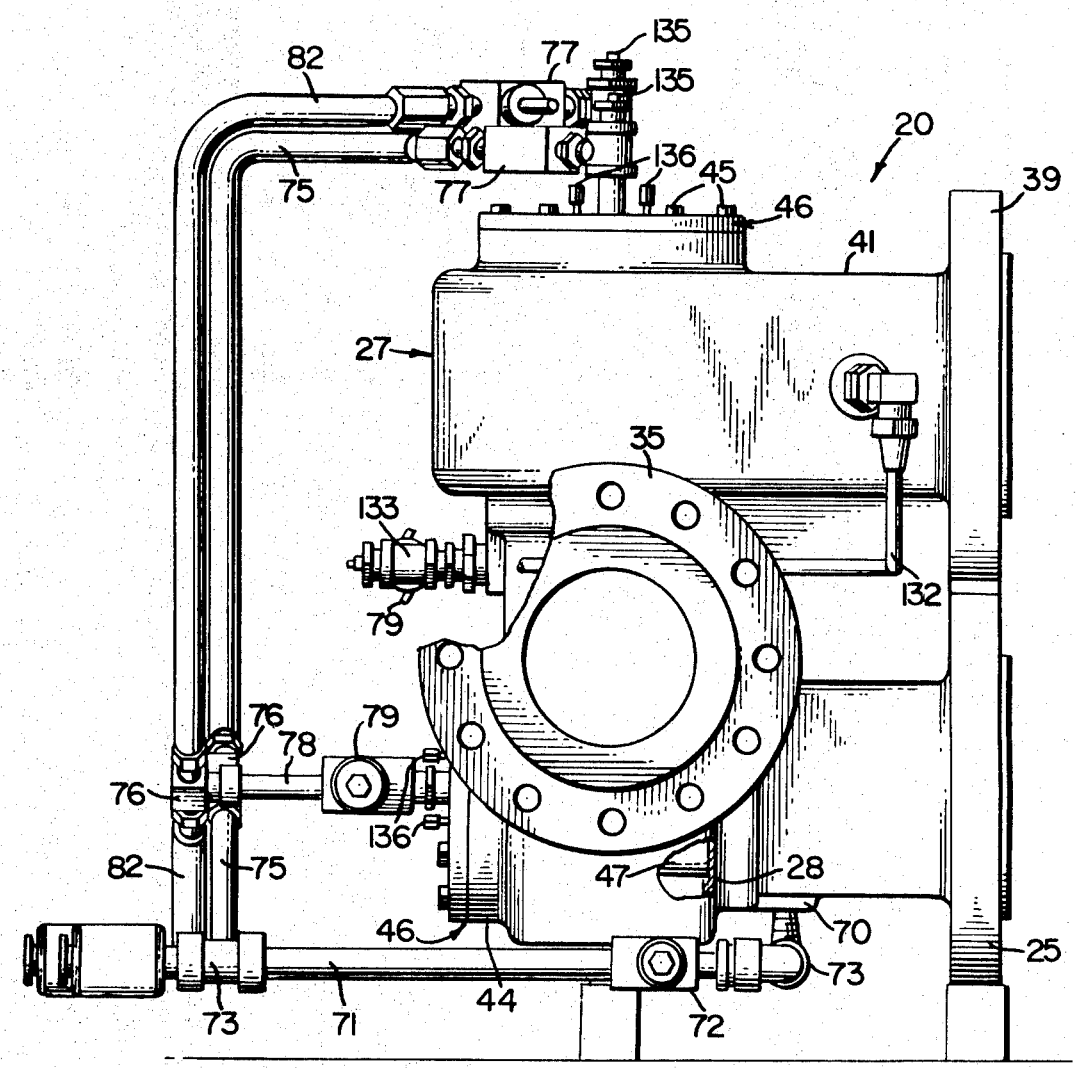
FIG. 6 is an elevational view of the four-way motor control valve of FIG. 1 as viewed from the side of FIG. 1 containing the motor supply port connection.

Referring for the moment to the schematic illustrations of FIG. 2 and the general perspective view of FIG. 1, the control system, predicated on the construction and assembly of valves 20 and 23 and their connections to fluid motor 21 and each other, will now be described. Driving fluid, usually oil from a suitable pump and supply source not shown, enters fluid control valve 20 through flanged inlet port 25 leading into an inlet chamber 26 (FIG. 2) of main valve body 27 delimited opposite inlet port 25 by a partition wall 28 (FIG. 2 and 6) defining a pair of laterally spaced flow passages 29 respectively leading from inlet chamber 26 into a first section of main valve body 27 the two loops of which respectively define laterally spaced noncommunicating motor chambers 32 and 34. Motor chamber 32 has a flanged motor connection port 33 right angularly related to flanged inlet port 25, and motor chamber 34 has a flanged motor connection port 35 right angularly related to flanged port 25. As best seen from an inspection of FIGS. 5 and 6, the horizontal axes of port 25 and flow passages 29 lie in a lowermost common horizontal plane while the horizontal axes of ports 33 and 35 lie in a common horizontal plane spaced above the plane of the uppermost portion of passages 29. The upper sidewalls of chambers 32 and 34 are formed to provide upwardly directed tubular passages 36 (FIGS. 1 and 5) defining respective flow passages 37 (FIG. 2) leading from chambers 32 and 34 to a second upper section of main valve body 27 defining an outlet chamber 38 (FIG. 2) having a flanged outlet port 39 lying in vertically spaced relation above flanged inlet port 25 (FIGS. 1 and 6) with its axis in a common vertical plane with the axis of flanged inlet port 25 and centered laterally with respect to the loop portions of the second or upper valve body section and the flow passages 37 of the first or lower valve body section. The top wall 41 of the upper valve body section in coaxially opposed relation to flow passages 37 and the end wall 42 of the lower valve body section in coaxially opposed relation to flow passages 29 are formed with through apertures 43 rimmed by outwardly directed annular bosses 44 (FIGS. 1, 5 and 6). Bosses 44 are provided with axially directed, angularly spaced tapped apertures (not shown) mounting attachment studs 45 removably mounting respective pressure responsive valve assemblies 46 for controlling the fluid flow through passages 29 and 37. Since each of these assemblies 46 is identical and operates in principle like the removable assembly of the aforesaid U.S. Pat. No. 2,841,359 to W. F. Berck, it is sufficient to state that each comprises a cylindrical body 47 of a length to span the depth respectively of motor chambers 32 and 34 and outlet chamber 38. Each cylindrical body 47 is closed at its outer end by flanges end wall 48 and is provided with external O-ring grooves and O-rings 49 in position to sealingly engage within flow passages 29, 37 and the through apertures 43 to confine fluid flow from inlet chamber 26 to motor chambers 32, 34 and from motor chambers 32, 34 to outlet chamber 38 to entering the inner ends of cylindrical bodies 47 through removable seat ring 50 held in place by a conventional split retainer ring and passing outwardly through sidewall ports 51 of bodies 47 when the normally closed valve elements 52, 53, 54 and 55 are selectively unseated. The valve elements are selectively unseated in operative pairings 52—55 or 53—54 to connect the motor loop composed of motor chamber 32, motor pipe 56 and motor 21, motor pipe 57 and motor chamber 34 to the pump loop composed of outlet chamber 38, pump inlet pipe 58, a fluid pump (not shown), pump outlet pipe 59, and inlet chamber 26 through a selected valve pair, for example 52—55 shown in their open positions by dot-dash lines in FIG. 2.

Selective operation of pressure responsive valve elements 52 through 55 is accomplished in accord with the present invention by the combined closing biasing force of a closing spring 61 seated at one end in the cavity provided by the rearwardly directed skirts of valve elements 52 through 55 and the controlled application of fluid pressure to the cavities of the respective valve elements through centered ports 62 provided in the respective end walls 48 of cylindrical bodies 47 of valve assemblies 46. While any available fluid pressure source could be employed, the present invention contemplates the use of the pressure energy of the motive fluid at the valve inlet chamber 26 which, it will be appreciated, will provide without need for complicated control equipment consistently higher opening force on valve elements 52 and 53 than is available in the valve outlet chamber 38 acting to open valve elements 54 and 55. This natural pressure differential is used to advantage by reason of the novel four-way control valve of the present invention which assures an identical opening force (valve inlet pressure) acting on the fluid inlet valve elements 52, 53 and an identical but proportionally lower opening force (valve outlet pressure determined solely by the pressure loss due to work done in driving motor 21 and conveying the motor fluid through the motor loop) acting on valve elements 54 and 55. Any variation in the valve inlet pressure will effect a corresponding variation in the valve outlet pressure and the biasing force applied to maintain valve elements 52 through 55 normally closed. To provide the desired response of the respective valve elements 52 through 55 upon actuation of the pilot control valve 23 to be hereinafter described in detail, the present invention provides two separate and distinct control circuits 63 and 64 (FIGS. 1 and 2) respectively pairing valve elements 52, 55 and valve elements 53, 54 for conjoint operation. While either control circuit may be connected to control flow to the fluid motor inlet 65 or the fluid motor outlet 66, the inlet 65 is shown in FIG. 1 to be connected by pipe 56 to flanged port 33 of motor chamber 32 and the outlet 66 is shown in FIG. 1 to be connected by pipe 57 to flanged port 35 of motor chamber 34. The motor inlet circuit, therefore, is controlled by valve elements 53, 54 operation of which is effected by control circuit 64 while operation of valve elements 52, 55 to supply motor fluid through the motor outlet circuit to reverse motor 21 is effected by control circuit 63. Since both control circuits 63, 64 are identical a description of one only will be given here.

Referring for the moment to control circuit 64, which will be referred to hereinafter as the motor inlet control circuit, it comprises a supply pipeline 71 (FIGS. 1 and 2) connected at one end through a tapped boss 70 and a T-fitting 73 (FIG. 6) to the inlet chamber 26 of control valve 20. A similar T-fitting 73 is connected to the corresponding supply pipeline of control circuit 63 referred to hereinafter as the motor outlet control circuit. Supply pipeline 71 includes a variable restriction, preferably in the form of a manually adjustable needle valve 72, and leads through a T-connection 73 to one of the inlets 74 (FIGS. 1, 2, and 3) of pilot control valve 23. T-connection 73 has a branch supply line 75 connected thereto to divert a portion of the fluid flow through supply line 71 for use in applying pressure to the cavities of valve elements 53 and 54. To this end branch supply line 75 leads through a T-connection 76 to a manually adjustable needle valve 77 threaded into tapped port 62 in end wall 48 of the upper right hand valve assembly 46 (FIGS. 1 and 5) containing valve element 54 to apply the line pressure (inlet chamber pressure so long as pilot control valve 23 remains in its normal "off" or closed position) to the cavity of valve element 54 to aid its spring 61 in normally maintaining valve element 54 firmly in its fully closed position. A portion of the flow through branch supply line 75 is diverted by T-connection 76 into and through branch supply line 78 and adjustable needle valve 79 threaded into tapped port 62 in end wall 48 of the lower left-hand valve assembly 46 (FIGS. 1 and 5) containing valve element 53 to apply the same line pressure to its cavity to aid its spring 61 in normally maintaining valve element 53 firmly in its fully closed position. The corresponding supply lines 81, 82 and 83, connected through corresponding T-connections 73 and 76 and corresponding needle valves 72, 77 and 79, connect valve inlet chamber 26 respectively to the other inlet 84 (FIGS. 1, 2 and 3) of pilot control valve 23, to the cavity of valve element 55 of the upper left hand valve assembly 46, and to the cavity of valve element 52 of the lower right hand valve assembly 46 in the same manner to normally maintain valve elements 52 and 55 firmly in their fully closed positions.

Under normal operation conditions with pilot control valve 23 in its intermediate "off" position (FIG. 3), the full inlet chamber pressure will be effectively applied to the chambers 85 and 86 surrounding the piston sections 87 of the respective poppets 88 and 89 of the pilot control valve 23 but will have little, if any, effect on sealing the poppets due to the minimum upstream area of the poppets exposed to the pressure and the combined opposing areas of the poppets and the opposing area of O-ring bearing groove and ring formations 91 provided on the pistons 87 to guide and seal the piston ends of the poppets in the cylinder chambers 92 formed in the flanged valve body end closure caps 93 bolted to the end faces of body 94 and provided to close and seal the outer ends of the respective chambers 85 and 86. Suitable O-ring groove and ring formations 91 in the ends of body 94 seal caps 93 against fluid and pressure leakage from the chambers. As best seen from an inspection of FIGS. 3 and 4, the valve body 94 of pilot control valve 23 comprises an elongated block of generally square configuration in cross section having a concentric longitudinally extending bore 95 of lesser diameter than chambers 85 and 86 interconnecting end chambers 85 and 86 and forming inwardly directed annular shoulders defining sharp sealing corners 96 at the inner ends of chambers 85 and 86. Body 94 intermediate its ends and below bore 95 is provided with a blind stepped bore 97 disposed at right angles to the axis of bore 95 and at opposite sides of stepped bore 97 is drilled inwardly to provide outlet ports 98 intersecting bore 95 adjacent but inwardly from sealing corners 96. Each of the poppets 88 and 89 at the inner end of piston sections 87 is enlarged in diameter to form an annular flange 100 beyond which the main body 99 is formed as a hemisphere merging into a stem portion 101 trailing an annular disclike terminal guide portion 102 having a sliding fit in bore 95. As best seen from FIG. 3, stem portion 101 is of such length that guide portion 102 in the normal closed position of poppets 88 and 89 lies only slightly beyond the intersection of outlet ports 98 with bore 95 assuring a free open intermediate area of bore 95 above and at opposite sides of right angularly related stepped bore 97. The innermost end 103 of stepped bore 97 (FIG. 4) forms a journal for the inner reduced diameter end 104 of rack pinion shaft 105 the drive pinion 106 of which is disposed adjacent journaled end 104 in the enlarged diameter portion 107 of stepped bore 97 lying immediately below and intersecting bore 95 sufficiently to assure meshing of pinion 106 with the downwardly projecting rack teeth 108 formed by chordally slotting the periphery of cylindrical actuator plunger 109 dimensioned for free sliding movement along bore 95 between the inner poppet guide portions 102. Shaft 105, immediately outwardly of pinion 106, is reduced in diameter below the root diameter of the teeth of pinion 106, then provided with an enlarged journal section 112 annularly grooved at 111 to receive an O-ring seal 113 engageable with the through bore of laterally flanged journal sleeve 114 bolted to the side face of body 94 in sealing engagement with an O-ring 113 on the clamp shoulder of bore 97 and a reduced diameter end 115 cross bored to receive a roll pin 116 or the like for fixing the hub 117 of a manually operable actuating handle 118 to the outer end of shaft 105. Actuator plunger 109 is longitudinally through drilled and tapped at 120 to receive hollow NYLOK socketheaded adjustment screws 121 adapted to be threaded in and out as required to preset the pickup point of the respective poppets 88 and 89 and assure full opening and closing of the poppets within the operative stroke of handle 118. It will also be noted that the stem portion of poppets 88 and 89 are through drilled at 122 so free fluid circulation is permitted from end to end of the poppets as well as the actuator plunger 109 thereby assuring relatively free shuttling of both the actuating plunger 109 and the respective poppets 89 back and forth through whatever fluid may be present in chambers 85, 86, bore 95 and chambers 92 under manual opening operation of lever 118 and spring closing movement under influence of biasing springs 123 acting between end closure caps 93 and the tapered bottom wall of piston sections 87.

Operation of the fluid motor control system just described is effected to supply motive fluid to motor 21 through motor port 65 by shifting lever 118 clockwise as viewed in FIGS. 1 and 2 from the position of FIG. 2 to the position of FIG. 1. Such clockwise movement rotates rack pinion 106 counterclockwise as seen in FIG. 3 shifting actuating plunger 109 partway toward chamber 85 connecting fluid inlet 74 to outlet port 98 adjacent chamber 85 and establishing fluid flow through pipeline control circuitry 64, inlet 74 and its related outlet port 98, the common outlet chamber 131 and outlet pipe 132 to outlet chamber 38. Flow of fluid through circuitry 64 as just described is assured since inlet chamber 26 is connected through flanged inlet port 25 and pipe 58 (see FIG. 1) to the outlet or high-pressure side of the fluid supply pump, outlet chamber 38 is connected through flanged outlet port 39 and pipe 59 (see FIG. 1) to the inlet or low-pressure side of the fluid supply pump, and the higher pressure prevailing on the upstream side of the actuated poppet 88 will effect such directional flow at the rate determined by the open position of the actuated poppet so long as the pressure differential described remains. Immediate flow from chamber 26 through valve closure member 53 to motor chamber 32 and to motor 21 through pipe 56 will not take place, however, since pressure responsive valve assemblies 46 containing valve closure members 53 and 54 under control of circuitry 64 is throttled through needle valves 79 and 77 respectively to establish a desired responsiveness of the respective valves. The delay, however, is customarily a short delay sufficient only to avoid a rapid build up of the final closing biasing force that might cause "hammering" in the overall fluid system. As soon as the flow past the actuated poppet 88 has been sufficient to establish a reduction of the total closing biasing force below the total opening force exerted on the valve closure members 53 (full outlet pump pressure) and 54 (pump inlet or motor loop pressure), valves 53 and 54 will move toward full open position to a position at which the biasing force (combined force of the springs 61 and the lower pressure in inlet chamber 26 on valve 53) balances the lowered pressure in inlet chamber 26 established by the rate of flow past valve closure member 53. Unless the actuated poppet 88 is further opened or moved toward its closed position, the fluid system will reach a point of equilibrium where the biasing force (spring and fluid pressure combined) on valve closure members 53 and 54 established by the fluid flow through control circuitry 64 under influence of the pump outlet pressure in chamber 26 balances the opening force (pressure differential on the upstream side of the respective valve closure members 53 and 54 established by the related operating pressures in chambers 26 and 34). Since the motor outlet pressure in valve outlet chamber 38 is always appreciably lower than the pump outlet pressure in valve inlet chamber 26 and as both valves 53 and 54 have the same biasing force acting thereon, the inlet valve 53 (or inlet valve 52 when control circuitry 63 is operating) will be open more than outlet valve 54 (or outlet valve 55 when control circuitry 63 is operating). It is thus assured that only one valve, the outlet valve, effects flow regulation when flow is established. It follows, therefore, that the operated valve pairs 53, 54 or 52, 55, are prevented from interacting with each other and "hunting" is eliminated. Furthermore, since no flow is permitted by the other poppet 89 cooperating with control circuitry 63, full pump outlet pressure (the fluid pressure of chamber 26) is maintained on the opposing valve pair (valves 52, 55) assuring that they are maintained fully closed.

When pilot valve handle 118 is restored to its off position flow through control circuit 64 is promptly blocked at the outlet end of chamber 85 by closing of poppet 88 under influences of spring 123 and any upstream pressure differential that may be effective to act on poppet 88. The pressure in control circuit 64 then builds up gradually until the biasing force on valve closure members 53 and 54 (spring force plus the rising fluid pressure in control circuit 64 approaching pump pressure in inlet chamber 26 times downstream area of the valve closures) exceeds the opening force (inlet chamber pressure times the upstream area of valve closure member 53 and outlet chamber pressure times the upstream area of valve closure member 54) effecting a closing of valve closure members 53 and 54 and throttling of fluid flow past valve closure members 53 and 54 in accord with the closing movement of poppet 88. Once closed the motor loop and pump loop will be fully isolated from each other by firmly closed value closure members 53 and 54 and cooling of the motive fluid in the motor loop and the resulting contraction of the volume of motive fluid may create a vacuum causing air to enter the motor loop. To prevent this a bypass pipe connection 133 is provided between the valve outlet chamber 38 and one of the valve motor chambers, chamber 34 in the present illustration, so oil from the pump loop will be available to enter the motor loop upon cooling of the oil to avoid the entry of air into the system. Bypass connection 133 is provided with a manually operable needle valve 79 permitting, when closed, a check operation to verify proper valve seating when necessary. Also the end closure caps 93 of pilot valve 23 are preferably provided with centered tapered through bores 134 tapped to receive pipe plugs 135 to bleed air and drain pilot valve 23 during initial setting up of the system.

Similar air bleed plugs 135 are provided in the end walls 48 of the upper pressure responsive valve assemblies 46 (FIGS. 5 and 6) to bleed air from the valve body 27 during the initial setting up of the system. Also to aid in removal of the pressure responsive valve assemblies 46 for servicing and replacement when necessary the end closure walls are through drilled and tapped at spaced points between studs 45 to receive jacking screws 136 (FIGS. 5, and 6) arranged to bear upon the end faces of annular bosses 44 to effect initial axial withdrawal of the respective assemblies 46.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A control valve for use in varying the rate and direction of flow of driving fluid through a fluid motor comprising a valve body comprising a lower body section defining a centered inlet port connection and chamber at one side, a pair of laterally offset motor chambers at the opposite side having respective port connections adapted for connection to the opposite sides of a fluid motor and respective fluid passages interconnecting said motor chambers with said inlet chamber and upwardly directed fluid passages leading into an upper body section defining an outlet chamber having a centered outlet port; respective pressure responsive valve assemblies including valve closure members mounted in said motor chambers and said outlet chamber in coaxial operative relation to the downstream side of the respective fluid passages for movement between normally closed and open valve positions in response to an effective overriding upstream fluid pressure to control fluid flow through said passages; biasing means individual to each of said valve assemblies respectively normally biasing said valve closure members to closed position, each of said biasing means including a biasing spring and a pair of branch pipelines connecting said inlet chamber respectively to the downstream side of one of the valve closure members controlling fluid flow from said inlet chamber to one of said motor chambers, and to the downstream side of the valve closure member controlling fluid flow from the other of said motor chambers to said outlet chamber.

2. The control valve of claim 1 wherein each of the pair of branch pipeline includes a pipeline forming a common connection for connecting the downstream sides of the valve closure members and the inlet chamber to a pilot control valve and said pipeline includes a manually operable needle valve in the line leading from said inlet chamber providing means for adjusting the effective downstream pressure on the several valve closure members in the full open position of the pilot control valve to approximate the outlet pressure in the control valve outlet chamber to correlate the differential pressure on the several valve control members to assure positioning them in full open position when the pilot valve is fully open.

3. The control valve of claim 2 together with respective manually operable needle valves in the respective pipelines to the several pressure responsive valve assemblies providing means for varying the fluid flow to said individual assemblies to assure optimum valve response.

4. The control valve of claim 1 together with a by-pass line including a manually operable needle valve interconnecting one of said motor chambers directly to said outlet chamber to forestall the creation of a vacuum in the motor loop upon full closing of said closure members of said pressure responsive valve assemblies.

5. A pressure responsive valve assembly for unitary installation and removal from a valve body providing a flow passage and coaxial passage in a body outer wall for supporting said valve assembly in end sealed relation to said flow passage comprising a cylinder having a flanged closure wall at one end formed with through openings adjacent the periphery of said flange and a centered tapped fluid port for connection to a source of pressure fluid, a removable valve seat within its opposite end, and sidewall ports downstream from said seat; a valve member slidably mounted within said cylinder and having a face formed to sealingly cooperate with said valve seat; spring means interposed between said flanged closure wall and the opposite face of said valve member to augment fluid pressure applied through said centered tapped port and normally bias said valve member in sealed engagement with said valve seat; screw means entered through certain of said through openings of said flange and threaded into said valve body to secure said valve assembly in position in said valve body flow passage and coaxial passage; and jacking screws partially threaded into others of said through openings of said flange to normally dispose their shank ends within said through openings opposite face portions of said valve body and adapted upon removal of said screws means to be threaded into abutting engagement with said face portions of said valve body to effect axial withdrawal of said valve assembly from its supported sealed relation in said passages.